United States Patent [19]
Windle

[11] 3,884,070
[45] May 20, 1975

[54] APPARATUS FOR TESTING CONDUIT
[75] Inventor: Tom J. Windle, Bartlesville, Okla.
[73] Assignee: Phillips Petroleum Company, Bartlesville, Okla.
[22] Filed: Sept. 11, 1972
[21] Appl. No.: 287,737

Related U.S. Application Data
[62] Division of Ser. No. 133,166, April 12, 1971, Pat. No. 3,709,260.

[52] U.S. Cl. .................... 73/49.8; 73/49.5; 138/90
[51] Int. Cl. ............................................. G01m 3/02
[58] Field of Search.................. 73/49.8, 49.1, 49.5; 138/90

[56] References Cited
UNITED STATES PATENTS
2,246,885  6/1941  Jones ..................................... 138/90
2,873,764  2/1959  Lombard et al. ................. 73/49.5 X
2,886,067  5/1959  Maxwell et al. ...................... 138/90
3,326,243  6/1957  Augustus .............................. 138/90
3,726,319  4/1973  Patterson ............................. 138/90

FOREIGN PATENTS OR APPLICATIONS
163,125  4/1958  Sweden ............................... 73/49.1

Primary Examiner—Richard C. Queisser
Assistant Examiner—Joseph W. Roskos

[57] ABSTRACT

An apparatus for passing fluid into a conduit for pressure testing said conduit, said apparatus being a pair of arcuate-shaped clamps each having an inner surface of arcuate configuration in the range of greater than 120° to less than 180° and a first end portion having a length greater than a portion of a mandrel to be inserted within a conduit for urging the conduit toward the mandrel during testing of the conduit, said mandrel having a chamber extending therethrough for passing fluid into the conduit.

3 Claims, 3 Drawing Figures

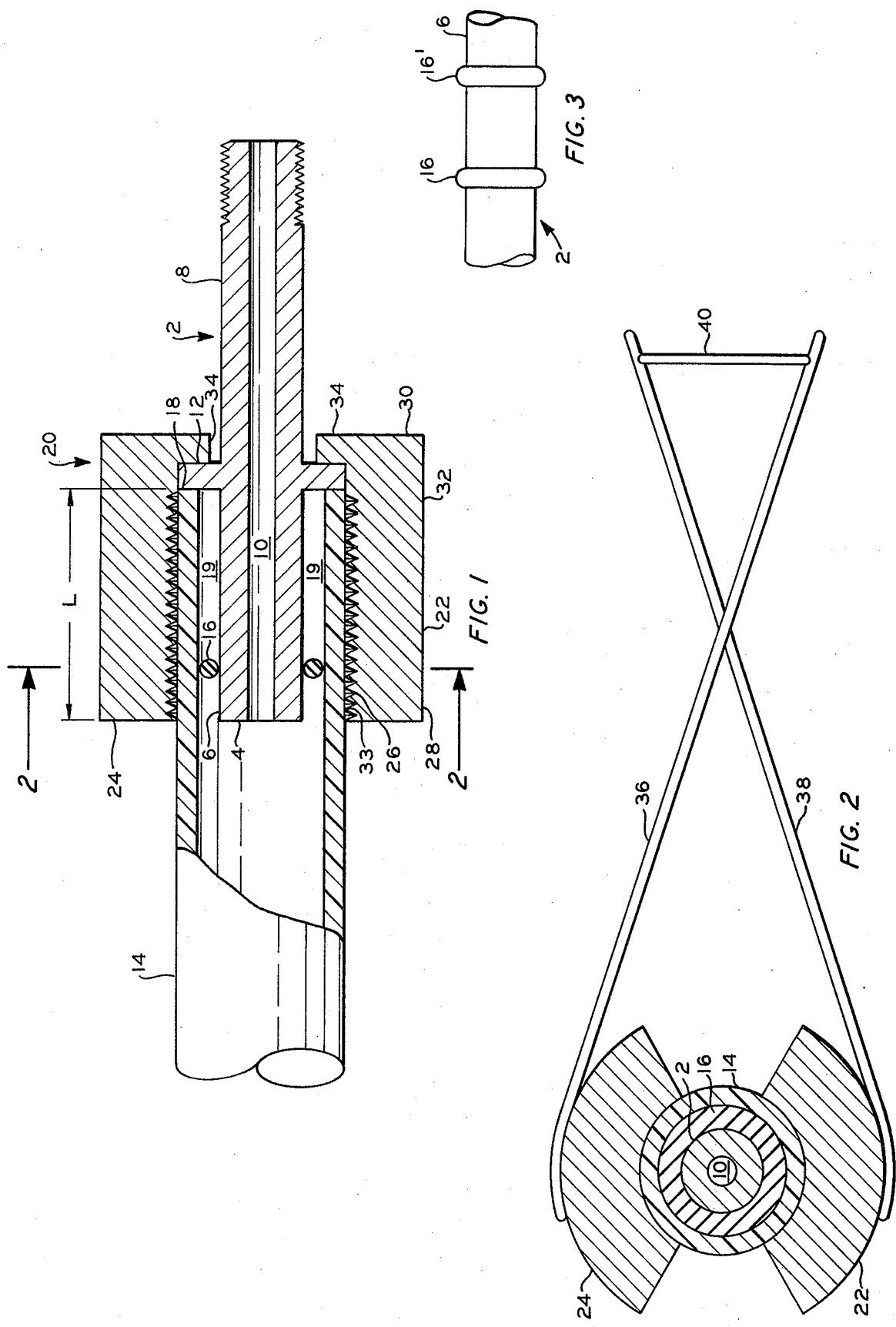

APPARATUS FOR TESTING CONDUIT

This is a divisional application of application Ser. No. 133,166, filed Apr. 12, 1971, now U.S. Pat. No. 3,709,260.

It is desired to provide apparatus utilized for pressurizing conduit for pressure testing said conduit. One example would be in the manufacture of plastic conduit for quality checking the burst pressure of selected lengths of the conduit. In such a situation, it is often necessary to pressure check hundreds of the conduits per day. It then becomes advantageous to provide apparatus that is easily installed and removed and will effectively seal an end of the conduit and provide for the passage of fluid into said conduit.

This invention therefore resides in an apparatus for passing fluid into a conduit for pressure testing said conduit. In one embodiment, a portion of a mandrel is maintained in sealable engagement within the conduit by a clamp that is pivotally movable for attachment to and release from the conduit and, in another embodiment, a seal between the mandrel and the conduit is formed by compressing a resilient member of the mandrel.

Other aspects, objects, and advantages of the present invention will become apparent from a study of the disclosure, the appended claims, and the drawing.

The drawings are diagrammatic views of the apparatus of this invention.

FIG. 1 is a partial sectional view of one embodiment of the apparatus;

FIG. 2 is a sectional view taken along line 2—2 of FIG. 1; and

FIG. 3 is a view of a plurality of annular resilient members mounted on the mandrel.

Referring to FIG. 1, a mandrel 2 of the apparatus of this invention has a first end 4, first and second end portions 6,8, a chamber 10 extending therethrough, and an annular flange 12 spaced a distance along the mandrel 2 from the first end 4 thereof. The flange 12 of the mandrel 2 is of at least greater diameter than the inside diameter of a conduit 14 that is to be tested by the apparatus of this invention.

The first end portion 6 of the mandrel 2 extends from the flange 12 of the mandrel 2 to the first end 4 of said mandrel 2. The first end portion 6 of the mandrel 2 is of smaller diameter than the inside diameter of the conduit 14 for insertion of said first end portion into the conduit 14 during pressure testing operations. The first end portion 6 of the mandrel 2 also has at least one resilient annular member 16 installed therein and thereabout that is substantially equal to or larger than the inside diameter of the conduit 14. That annular member 16 must not, however, be so large that the mandrel 2 cannot be inserted into the conduit 14 or is inserted with difficulty. An example of such a resilient annular member is commonly called an O-ring. Where O-rings are utilized, the dimensions and resiliency necessary for proper sealing can be easily calculated and selected by one skilled in the art. In the inserted position of the mandrel 2 within the conduit 14, the flange 12 of the mandrel 2 is abutting end 18 of the conduit 14 and the annular member 16 is sealing the annulus 19 formed between the conduit 14 and the mandrel 2 as shown in FIG. 2.

A removable clamp 20 is provided for maintaining the first end portion 6 of the mandrel 2 within the conduit 14 during passage of fluid through the mandrel 2 and into the conduit 14 for pressure testing said conduit. During pressure testing, the other end of the conduit 14 is sealed by any means known in the art. Where extremely long lengths of conduit and/or extremely large diameter conduits are being tested, both ends of the conduit can be provided with the apparatus of this invention to increase the speed of filling and pressure testing said conduit.

The preferred removable clamp 20, as shown in FIGS. 1 and 2, has opposed first and second portions 22,24 pivotally connected one to the other with each portion 22 and 24 having an inner surface 26. The inner surface 26 of each portion 22,24 of the clamp 20 has first and second end portions 28,30 and a middle portion 32.

The first end portion 28 of the inner surface 26 of each clamp portion 22,24 is of arcuate configuration and has a length (L) at least greater than the distance from the resilient annular member 16 to the flange 12 of the mandrel 2. The middle portion 32 of each clamp portion 22,24 has a length at least equal to the width of the flange 12 of the mandrel 2. The second end portion 28 of each clamp portion 22,24 has an inwardly extending flange 34 of dimensions sufficient for engaging the upstream side of the flange 12 of the mandrel 2 in the installed position.

In order to provide for increased resistance against movement of the clamp 20 relative to the conduit 14 during testing of the conduit 14, it is preferred that the inner surface 26 of the first end portion 28 of each clamp portion 22,24 be serrated or have protrusions 33 formed thereon. These protrusions 33 are particularly useful for preventing relative movement where high testing pressures are to be utilized.

The first and second clamp portions 22,24 are pivotally movable between the first position (not shown) at which the inner surface 26 of each clamp portion 22,24 is spaced from the conduit 14 and the mandrel 2 for inserting into and removing the mandrel 2 from the conduit 14, and a second position at which the inner surface first end portion 28 of the clamp portions 22,24 are in contact with the conduit 14 and forcefully urging and deforming said conduit 14 against the annular member 16 of the mandrel 2 and being in contact with the flange 12 of the mandrel 2.

Referring to FIG. 2, first and second members 36,38 are each fixedly attached at an end to a separate one of the clamp portions 22,24. The members extend laterally from said members 26,28 and are pivotally connected one to the other for pivotally connecting the clamp portions 22,24 for pivotal movement of one relative to the other. A locking member 40, such as a bar releasably hooked into openings formed through the members 36,38 can be provided for maintaining the clamp portions 22,24 at their second position. Other locking means known in the art can be so utilized, such as, for example, the members 36 and 38 of the handle portion of the tool commonly referred to as vise grip pliers.

It is preferred in the apparatus shown in FIGS. 1 and 2, that the flange 34 of each of the second end portions 28,30 in the installed position are each in contact with the flange 12 and spaced from the second end portion 8 of the mandrel for better gripping and maintaining the mandrel 2 properly positioned during pressure testing operations. It is also preferred that the inner surface first end portion 28 of each clamp portion 22,24 at the second position of the clamp 20 be in contact with the outer surface of the conduit 14 through an arc of at least 120° and less than 180° about said conduit 14.

Referring to FIG. 3, where high testing pressures are utilized, a plurality of resilient annular members 16,16' spaced one from the other can be provided on the first end portion 6 of the mandrel 2 for more effectively seating the annulus 19.

The flange 12 of the mandrel 2 of FIGS. 1 and 2 can be of greater diameter than the outside diameter of the conduit 14, but for ease in construction, it is preferred that said flange 12 be substantially equal to said conduit diameter. The arcuate configuration of the inner surface first end portion 28 of each clamp portion 22,24 is also preferably matable with the configuration of the conduit.

In the sealed condition of the conduit with the apparatus of this invention, conduit can be effectively pressure tested. Owing to the construction of the apparatus, the set up and take down time of the testing equipment is significantly reduced relative to heretofore utilized pressure testing apparatus.

Other modifications and alterations of this invention will become apparent to those skilled in the art from the foregoing discussion and accompanying drawing, and it should be understood that this invention is not to be unduly limited thereto.

What is claimed is:

1. An apparatus for passing fluid into a plastic conduit for pressure testing said conduit, comprising:
   a mandrel having a first end, first and second end portions, a chamber extending therethrough, and an annular flange of at least greater diameter than the inside diameter of the conduit and being spaced a distance along the mandrel from said first end, said first end portion extending from the flange to the first end of the mandrel being of smaller diameter than the inside diameter of the conduit and having at least one resilient annular member having an outer diameter substantially equal to the inside diameter of the conduit for insertion of the first end portion and associated annular member into the conduit with said annular flange in contact with said conduit; and
   a removable clamp having separate, opposed first and second portions with each portion having an inner surface with first and second end portions and a middle portion, said first end portion of the inner surface of each clamp portion being of an arcuate configuration in the range of greater than 120° to less than 180° and having a length at least greater than the distance from the resilient annular member to the flange of the mandrel, said middle portion of each clamp portion being of a length at least equal to the width of the flange of the mandrel and said second end portion of each clamp portion having an inwardly extending flange of dimensions sufficient for extending over the flange of the mandrel in the installed position thereof, said first and second clamp portions being pivotally attached and pivotally movable between a first position at which the inner surfaces of the clamp portion are spaced from the conduit and the mandrel for inserting into and removing the mandrel from the conduit and a second position at which the first end portions of the clamp portions are in contact with the conduit and forcefully urging said conduit against the resilient annular member of the mandrel positioned therein with the flange of the clamp extending over and contacting the flange of the mandrel for maintaining the first end portion of the mandrel within the conduit during passage of fluid through the mandrel and into the conduit for pressure testing said conduit.

2. An apparatus, as set forth in claim 1, wherein there are a plurality of resilient annular members spaced one from the other along the first end portion of the mandrel.

3. An apparatus according to claim 1 wherein said resilient annular member has an outer diameter at least substantially equal to the inside diameter of the conduit; said first end portion of the inner surface of each clamp portion has a length such that the first end portion extends from the flanged portion of the mandrel to a point beyond said resilient annular member; and said first and second clamp portions are each fixedly attached, respectively, to a member extending away from each said clamp portions, said members being pivotally attached, at a point laterally removed from said clamp portions.

* * * * *